United States Patent
Lee et al.

(10) Patent No.: US 9,645,419 B2
(45) Date of Patent: May 9, 2017

(54) DETACHMENT APPARATUS HAVING ARCHED DRUM PAD AND METHOD FOR FABRICATING LIGHTWEIGHT, THIN LIQUID CRYSTAL DISPLAY DEVICE USING THE SAME

(71) Applicant: LG Display Co., Ltd., Seoul (KR)

(72) Inventors: JaeWon Lee, Goyang-si (KR); JeongJoon Lee, Goyang-si (KR); DaeHoon Lee, Daegu (KR); Byongll Lee, Paju-si (KR); JinKyoung Kim, Gyeongsangbuk-do (KR); KiBok Kang, Gunpo-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/144,173

(22) Filed: May 2, 2016

(65) Prior Publication Data

US 2016/0246082 A1    Aug. 25, 2016

Related U.S. Application Data

(62) Division of application No. 13/955,893, filed on Jul. 31, 2013, now Pat. No. 9,354,460.

(30) Foreign Application Priority Data

Dec. 24, 2012 (KR) .................. 10-2012-0152377

(51) Int. Cl.
*G02F 1/1333* (2006.01)
*G02F 1/13* (2006.01)

(52) U.S. Cl.
CPC .......... *G02F 1/1303* (2013.01); *G02F 1/1333* (2013.01)

(58) Field of Classification Search
CPC .................. G02F 1/1303; G02F 1/1333
See application file for complete search history.

(56) References Cited

U.S. PATENT DOCUMENTS

2009/0058915 A1* 3/2009 Hayashi ............. B41J 2/16585
                                                                    347/17
2009/0079807 A1* 3/2009 Yamashita ............ B41J 2/0057
                                                                    347/102
(Continued)

FOREIGN PATENT DOCUMENTS

CN         1909982 A      2/2007
CN       101434141 A      5/2009
(Continued)

OTHER PUBLICATIONS

Chinese Office Action, Chinese Application No. 201310337290.4, Jan. 4, 2016, 12 pages.
(Continued)

*Primary Examiner* — James Dudek
(74) *Attorney, Agent, or Firm* — Fenwick & West LLP

(57) ABSTRACT

A detachment apparatus having an arched drum pad and a method for fabricating a lightweight, thin liquid crystal display (LCD) device using the same are provided. The detachment apparatus includes: a table to which an object to be processed is loaded; an arched drum pad installed over the table and including O-rings formed on a lower surface thereof and a plurality of vacuum compartments demarcated by the O-rings; and a plurality of driving units configured to control a position of the drum pad. In case of using an auxiliary substrate to perform a process of a thin glass substrate, the auxiliary substrate can be easily separated from a liquid crystal panel in a cell state attached after processes are completed by using the arched drum pad having O-rings and a plurality of vacuum compartments.

12 Claims, 14 Drawing Sheets

(56) References Cited

U.S. PATENT DOCUMENTS

| | | |
|---|---|---|
| 2010/0206485 A1 | 8/2010 | Kodera |
| 2013/0241128 A1* | 9/2013 | Eda ...................... B32B 37/003 269/21 |
| 2013/0316609 A1 | 11/2013 | Kwon |

FOREIGN PATENT DOCUMENTS

| | | |
|---|---|---|
| CN | 102101373 A | 6/2011 |
| JP | 2007-001682 A | 1/2007 |

OTHER PUBLICATIONS

United States Office Action, U.S. Appl. No. 13/955,893, Oct. 20, 2015, 8 pages.

* cited by examiner

DETACHMENT APPARATUS HAVING ARCHED DRUM PAD AND METHOD FOR FABRICATING LIGHTWEIGHT, THIN LIQUID CRYSTAL DISPLAY DEVICE USING THE SAME

CROSS-REFERENCE TO RELATED APPLICATIONS

This application is a divisional application of U.S. patent application Ser. No. 13/955,893 filed on Jul. 31, 2013, which claims the benefit of Republic of Korea Patent Application No. 10-2012-0152377 filed on Dec. 24, 2012, each of which are hereby incorporated by reference in their entirety.

BACKGROUND OF THE INVENTION

1. Field of the Invention

The present disclosure relates to a method for fabricating a liquid crystal display device and, more particularly, to a detachment apparatus having an arched drum pad, and a method for fabricating a lightweight and thin liquid crystal display device using the same.

2. Background of the Invention

Recently, as society has entered a full-fledged information age, display fields of processing and displaying a large quantity of information has been rapidly advanced, and in particular, a thin film transistor (TFT) liquid crystal display device (LCD) having excellent performance such as being lightweight, having a reduced thickness, and consuming a small amount of power, has been developed to replace existing cathode ray tubes (CRTs).

An LCD device includes a color filter substrate, an array substrate and a liquid crystal layer formed between the color filter substrate and the array substrate.

The color filter substrate includes a color filter including sub-color filters that implement red, green and blue colors, a black matrix demarcating the sub-color filters and blocking light transmission through the liquid crystal layer, and a transparent common electrode applying a voltage to the liquid crystal layer.

The array substrate includes gate lines and data lines arranged vertically and horizontally to define pixel regions. Here, TFTs (T), switching elements, are formed at respective crossings of the gate lines and the data lines, and pixel electrodes are formed on the respective pixel regions.

The color filter substrate and the array substrate are attached in a facing manner by a sealant (not shown) formed at edges of an image display region to form a liquid crystal panel, and the attachment of the color filter substrate and the array substrate is made by an attachment key formed on the color filter substrate or the array substrate.

An LCD device is commonly used in a portable electronic device, so in order to enhance portability of an electronic device, a size and weight of an LCD device must be reduced. In addition, as a large LCD device has been fabricated, demand for a lighter and thinner LCD device is on the rise.

A thickness and weight of an LCD device may be reduced in various manners, but there is a limitation in reducing a structure and essential components of an LCD device in terms of current technologies. In addition, weights of essential components are so small that it may be difficult to reduce an overall thickness or weight of the LCD device by reducing the weights of the essential elements.

Thus, a method for reducing a thickness and weight of an LCD device by reducing a thickness of a color filter substrate and an array substrate constituting a liquid crystal panel has been actively studied. However, since a thin substrate must be used, when the thin film is transferred between a plurality of unit processes or when unit processes are performed, the thin film may be warped or broken.

SUMMARY OF THE INVENTION

Therefore, an aspect of the detailed description is to provide a method for fabricating a lightweight and thin liquid crystal display device in which a thin glass substrate is prevented from being damaged by attaching an auxiliary substrate to the thin film glass substrate and performing processes.

Another aspect of the present invention provides a detachment apparatus having an arched drum pad capable of easily separate an auxiliary substrate from a liquid crystal panel in an attached cell state after processes are completed, and a method for fabricating a lightweight and thin liquid crystal display (LCD) device.

To achieve these and other advantages and in accordance with the purpose of this specification, as embodied and broadly described herein, a detachment apparatus having an arched drum pad includes: a table to which an object to be processed is loaded; an arched drum pad installed over the table and including O-rings formed on a lower surface thereof and a plurality of vacuum compartments demarcated by the O-rings; and a plurality of driving units configured to control a position of the drum pad.

The object to be processed may be a process-completed liquid crystal panel in a cell state, and auxiliary substrates may be attached to both sides of the liquid crystal panel.

The detachment apparatus may further include: a push pin and a gap knife for forming an initial gap to separate each of the auxiliary substrates from the liquid crystal panel.

The detachment apparatus may further include: an air knife jetting air to a gap between the liquid crystal panel and each of the auxiliary substrates during a detachment process to allow each of the auxiliary substrates to be easily separated.

The plurality of driving units may include an A-axis driving unit, a B-axis driving unit, and a C-axis driving unit adjusting a vertical rotation, a vertical height, and a horizontal position of the drum pad, respectively.

The A-axis driving unit may be connected to one side of the drum pad, and a vertical rotation of the drum pad may be made according to a vertical movement of the A-axis driving unit.

The B-axis driving unit may be connected to a central portion of the drum pad to adjust a vertical height of the entirety of the drum pad, and the C-axis driving unit may be installed between the B-axis driving unit and the drum pad to adjust a horizontal position of the entirety of the drum pad.

Movement values of axes of the respective driving units may be set for respective points from a point at which detachment of each of the auxiliary substrate starts to a point at which the detachment ends, and axes of the respective driving units may be moved vertically or horizontally according to the pre-set values.

The O-rings may include a first O-ring having a rectangular shape constituting the rim and a plurality of second O-rings connected to both sides of the first O-ring and having a lattice shape.

The O-rings may be made of a material having excellent thermal, chemical, and physical durability of natural rubber or silicon.

The vacuum compartments may be demarcated by the first and second O-rings, have an elongated rectangular shape, include a vacuum groove line having a trapezoid shape and a plurality of absorption holes formed in the vacuum groove line and extending to an upper surface of the drum pad to form individual vacuum in each of the vacuum compartments.

A surface of the arched drum pad may be coated with fluorine or carbon nano-tube to prevent damage to the auxiliary substrates due to static electricity.

To achieve these and other advantages and in accordance with the purpose of this specification, as embodied and broadly described herein, a method for fabricating a lightweight, thin liquid crystal display (LCD) device includes: providing first and second auxiliary substrates and first and second thin mother substrates; attaching the first and second auxiliary substrates to the first and second thin mother substrates, respectively; performing an array process on the first mother substrate with the first auxiliary substrates attached thereto; performing a color filter process on the second mother substrate with the second auxiliary substrate attached thereto; attaching the array process-finished first mother substrate and the color filter process-finished second mother substrate; providing a detachment apparatus including an arched drum pad having O-rings formed on a lower surface thereof and a plurality of vacuum compartments formed on the lower surface and demarcated by the O-rings; loading the attached first and second mother substrates onto a table of the detachment apparatus; separating the second auxiliary substrate from the second mother substrate by using the drum pad; reversing the first and second mother substrates without the second auxiliary substrate and loading the same onto the table; and separating the first auxiliary substrate from the first mother substrate by using the drum pad.

The separating of the second auxiliary substrate from the second mother substrate may include: lowering a front end of the drum pad and simultaneously lifting a rear end thereof and absorbing a surface of the front end of the second auxiliary substrate through the vacuum compartments of the drum pad; and gradually lifting the front end of the drum pad with the second auxiliary substrate absorbed thereto, and simultaneously gradually lowering the rear end of the drum pad to separate the second auxiliary substrate from the second mother substrate.

Before the second auxiliary substrate is separated, push pin regions exposed from both corners of the second auxiliary substrate may be pushed upward with predetermined pressure by using bar-like push pins to form a gap knife entry space between the second auxiliary substrate and the second mother substrate.

A gap knife may be introduced into the gap knife entry space and moved from one side to the other side of the table to detach edge portions between the second auxiliary substrate and the second mother substrate to form an initial gap.

The separating of the first auxiliary substrate from the first mother substrate may include: lowering a front end of the drum pad and simultaneously lifting a rear end thereof and absorbing a surface of the front end of the first auxiliary substrate through the vacuum compartments of the drum pad; and gradually lifting the front end of the drum pad with the first auxiliary substrate absorbed thereto, and simultaneously gradually lowering the rear end of the drum pad to separate the first auxiliary substrate from the first mother substrate.

Before the first auxiliary substrate is separated, push pin regions exposed from both corners of the first auxiliary substrate may be pushed upward with predetermined pressure by using bar-like push pins to form a gap knife entry space between the first auxiliary substrate and the first mother substrate.

A gap knife may be introduced into the gap knife entry space and moved from one side to the other side of the table to detach edge portions between the first auxiliary substrate and the first mother substrate to form an initial gap.

As described above, according to the method for fabricating a lightweight, thin LCD device, a lightweight, thin LCD device using a thin glass substrate can be implemented, and thus, a thickness and weight of a television or monitor model and a portable electronic device.

Also, in the case of the detachment apparatus having an arched drum pad and the method for fabricating a lightweight, thin LCD device using the same, the auxiliary substrates can be easily separated from the liquid crystal panel in a cell state attached after processes are completed, by using the arched drum pad having O-rings and a plurality of vacuum compartments. Thus, a tact time can be minimized and the processes are stabilized, enhancing price competitiveness of a product.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Figure 1:
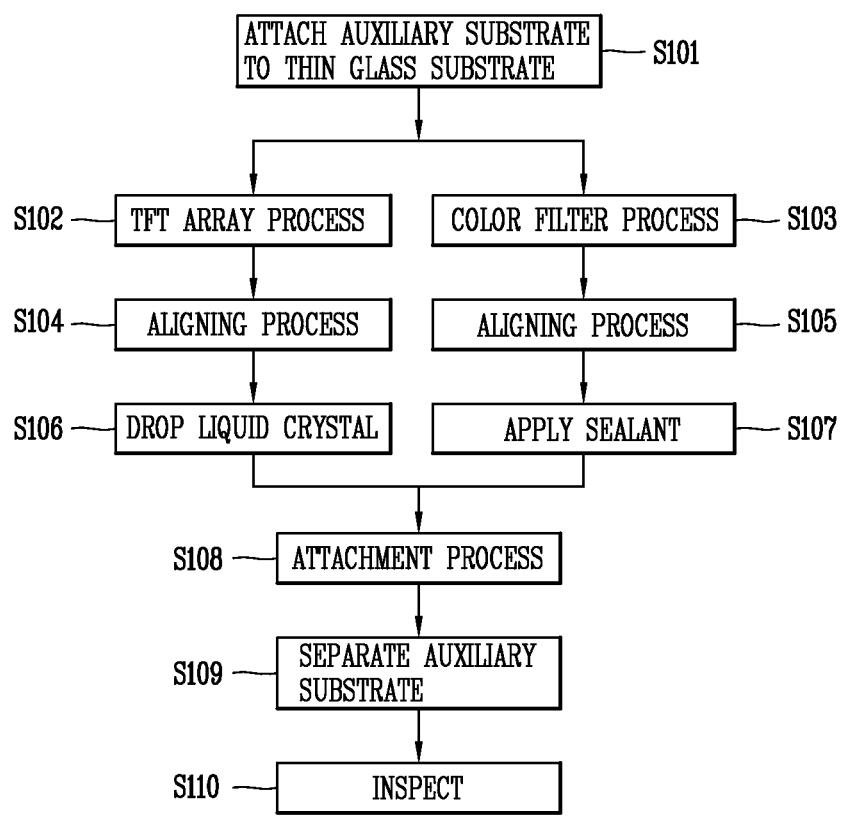
FIG. 1 is a flow chart schematically illustrating a method for fabricating a lightweight, thin liquid crystal display (LCD) device according to an embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Recently, as purposes of liquid crystal display (LCD) devices have been diversified, interest in lightweight, thin LCD devices are on the rise and thinning of a substrate taking the largest share in a thickness of a liquid crystal panel is growing. Also, a 3D or touch panel additionally requires a retarder or a touch function protection substrates to be attached to a liquid crystal panel, demand for reducing a thickness thereof is increasing. However, in the case of a thin substrate, physical properties such as warpage (or bowing), rigidness, and the like, are weakened, having a limitation in performing a process.

As a solution, a method for attaching an auxiliary substrate to a thin glass substrate, performing a process, and separating the auxiliary substrate from the thin glass substrate after the process is completed has been attempted. In particular, in an embodiment of the present invention, an auxiliary substrate is attached to a glass substrate by using electrostatic force, vacuum force, surface tension, or the like, and processes are performed thereon, and the auxiliary substrate attached to the liquid crystal panel in a cell state through the process is easily separated from the liquid crystal panel by using an arched drum pad having O-rings and a plurality of vacuum compartments.

Hereinafter, a detachment apparatus having an arched drum pad and a method for fabricating a lightweight, thin liquid crystal display (LCD) device using the same according to an embodiment of the present invention will be described in detail such that a person skilled in the art can easily carry out the same.

The foregoing and other objects, features, aspects and advantages of the present invention will be described in detail through embodiments described hereinafter in conjunction with the accompanying drawings. However, embodiments of the present invention may, however, be implemented in many different forms and should not be construed as being limited to the embodiments set forth herein. Rather, these embodiments are provided so that this disclosure will be thorough and complete, and will fully convey the scope of the invention to those skilled in the art and are defined by the claim coverage of the present invention. Throughout the specification, the same reference numerals will be used to designate the same or like components.

FIG. 1 is a flow chart schematically illustrating a method for fabricating a lightweight, thin liquid crystal display (LCD) device according to an embodiment of the present invention.

Here, FIG. 1 illustrates an example of a method for fabricating a liquid crystal display device when a liquid crystal layer is formed according to a liquid crystal dispensing method, but the present invention is not limited thereto and may also be applied to a method for fabricating an LCD device when a liquid crystal layer is formed according to a liquid crystal injection method.

A process of fabricating an LCD device may be divided into a driving element array process of forming a driving element on a lower array substrate, a color filter process of forming color filters on an upper color filter substrate, and a cell process.

As mentioned above, factors affecting a thickness and weight of an LCD device may be diverse, and among them, the array substrate or the color filter substrate made of glass are the heaviest among other components. Thus, in order to reduce a thickness and weight of the LCD device, it is most effective to reduce a thickness or weight of the glass substrates.

In order to reduce a thickness and weight of the glass substrates, the glass substrates are etched to reduce a thickness thereof or a thin glass substrate is used. The first method is reducing the thickness by additionally performing a glass etching process after a cell is completed. This method, however, is disadvantageous in that a defect occurs during the etching process and cost is increased.

Thus, in an embodiment of the present invention, an array process, a color filter process, and a cell process are performed by using a thin glass substrate having a thickness ranging from 0.1 t to 0.4 t. In this case, since the thin glass substrate is attached to an auxiliary substrate and the processes are performed, influence of warpage of the thin glass substrate is minimized and the thin glass substrate is not damaged when it is transferred. Here, 't' refers to mm. Namely, 0.1 t refers to a thickness of 0.1 mm and 0.4 t refers to a thickness of 0.4 mm. In the following description, mm will be denoted by T for the description purpose.

Namely, the thin glass substrate having a thickness ranging from 0.1 t to 0.4 t is significantly warped when put into a general LCD device fabrication line, resulting in that the substrate is severely sagged, having a problem in that it is difficult for the substrate to be transferred by using a moving means such as a cassette, or the like. Also, when the substrate is loaded into or unloaded from unit process equipment, the substrate is rapidly warped even with small impact applied thereto, frequently causing a position error, and as a result, the substrate is damaged due to collision, or the like, substantially making it impossible to perform the process.

Thus, in the present embodiment, an auxiliary substrate is attached to the thin glass substrate having a thickness ranging from 0.1 t to 0.4 t before the substrate is put into a fabrication line, to allow the substrate to have the same warpage characteristics as or more enhanced warpage characteristics than those of a glass substrate having a thickness of approximately 0.7 used in a general LCD device, thus preventing sagging of the substrate while being transferred to while a unit process is being performed.

First, before a thin glass substrate having a thickness ranging from 0.1 t to 0.4 t is put into a fabrication line of an array process or a color filter process, an auxiliary substrate having a thickness ranging from 0.3 t to 0.7 t is attached to the thin glass substrate having a thickness ranging from 0.1 t to 0.4 t (S101). However, the present invention is not limited to the thickness of the thin glass substrate and the auxiliary substrate.

The thin glass substrate and the auxiliary substrate may be brought into contact in a vacuum state so as to be attached. In this case, bonding strength between the two substrates may be based on vacuum force, van der Waals force, electrostatic force, molecular binding, and the like.

Here, the auxiliary substrate may be subjected to plasma processing using fluorine, or the like, or surfactant processing, or a concave-convex pattern may be formed on the auxiliary substrate to alleviate bonding strength to facilitate detachment of the auxiliary substrate from the thin glass substrate. This will be described in detail with reference to the accompanying drawings. However, the present invention is not limited thereto and the thin glass substrate and the auxiliary FIGS. 2A through 2D are views schematically illustrating portions of processes of method for fabricating a lightweight, thin liquid crystal display (LCD) device according to an embodiment of the present invention, in which an example of processes of attaching and detaching the thin glass substrate and the plasma or surfactant-processed auxiliary substrate is shown.

Here, in FIGS. 2A through 2D, a plasma or surfactant treatment is performed on the entire surface of the auxiliary substrate to alleviate bonding strength between the auxiliary substrate and the thin glass substrate to facilitate attachment and detachment between the auxiliary substrate and the thin glass substrate. However, the present invention is not limited thereto.

Figure 2A:
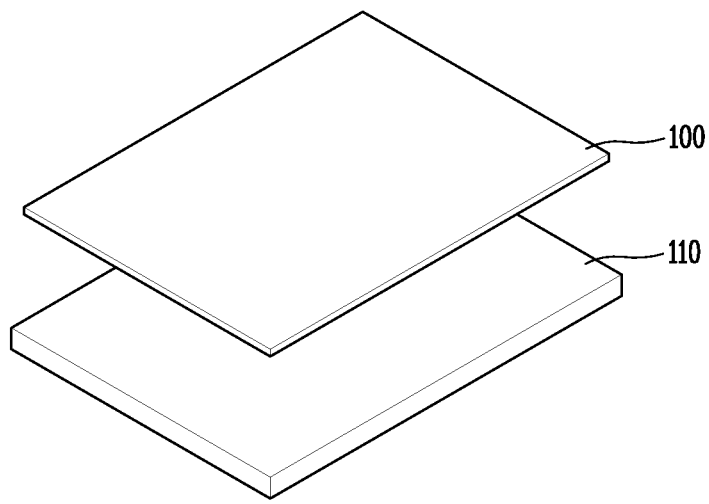
FIGS. 2A through 2D are views schematically illustrating portions of processes of method for fabricating a lightweight, thin liquid crystal display (LCD) device according to an embodiment of the present invention.

As illustrated in FIG. 2A, for example, thin glass substrate 100 having a thickness ranging from 0.1 t to 0.4 t and an auxiliary substrate 110 having a thickness ranging from 0.3 t to 0.7 t are prepared.

Here, the thin glass substrate 100 may be a large mother substrate in which a plurality of color filter substrates for a color filter process are disposed or a large mother substrate in which a plurality of array substrates for an array substrate are disposed.

Figure 2B:
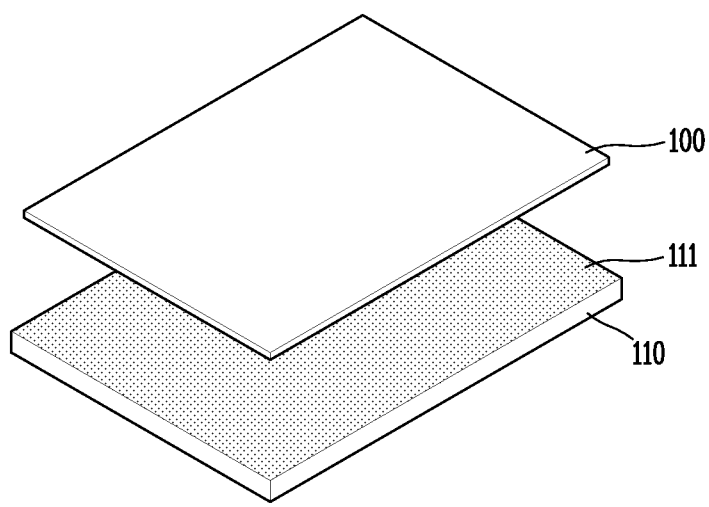

Next, as illustrated in FIG. 2B, the entire surface 111 of the auxiliary substrate 110 is treated with a surfactant or plasma using fluorine, or the like.

When the auxiliary substrate 110 is treated with fluorine, fluorine etches the surface 111 of the auxiliary substrate 110 to increase surface roughness or change chemical characteristics of the surface of the auxiliary substrate 110 to weaken bonding strength with the thin glass substrate 100 through contact.

Alternatively, in a case in which the auxiliary substrate 110 is treated with a surfactant when cleaned, —OH group between the auxiliary substrate 110 and the thin glass substrate 100 may be reduced, thus mitigating bonding strength therebetween.

Figure 2C:
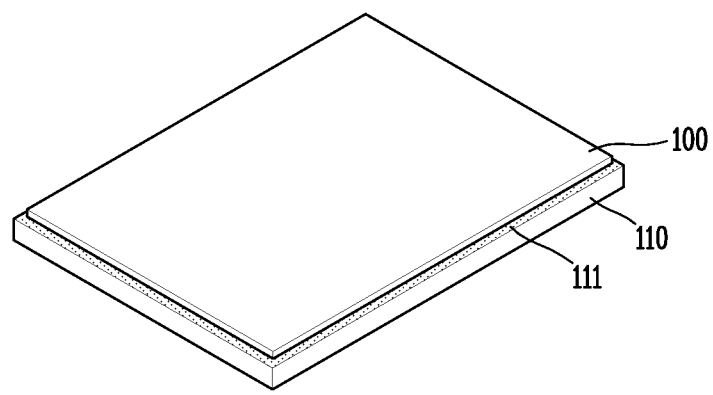

Thereafter, as illustrated in FIG. 2C, the auxiliary substrate 110 treated with plasma or a surfactant is attached to the thin glass substrate 100. Here, in a case in which a glass substrate is used as the auxiliary substrate 100, the thin glass substrate 100 and the auxiliary substrate 110 may be brought into contact in a vacuum state so as to be attached, and in this case, the bonding strength between the two substrates 100 and 110 may be based on vacuum force, van der Waals force, electrostatic force, molecular binding, and the like.

In this manner, in the case of the process panel obtained by attaching the thin glass substrate 100 having the thickness ranging from 0.1 t to 0.4 t and the auxiliary substrate 110 having the thickness ranging from 0.3 t to 0.7 t, since the thin glass substrate 100 and the auxiliary substrate 110 constituting the process panel are made of the same glass material, coefficients of expansion according to a change in temperature are the same, eliminating the process in which warpage occurs due to a difference in coefficients of expansion in performing unit processes.

Also, although the thin glass substrate 100 has the thickness ranging from 0.1 t to 0.4 t, since it is attached with the auxiliary substrate 110 to form a process panel, warpage thereof is remarkably reduced. Also, since the glass substrate 100 with the auxiliary substrate 110 attached thereto has a warpage level, which is the same as or less than that of a general glass substrate having a thickness of 0.7 t, there is no problem in performing a unit process for an LCD device.

Thereafter, a color filter process or an array process as described hereinafter is performed on the thin glass substrate 100 with the auxiliary substrate 110 attached thereto to form thin film transistors (TFTs) as driving elements or a color filter layer in respective panel regions.

Figure 2D:
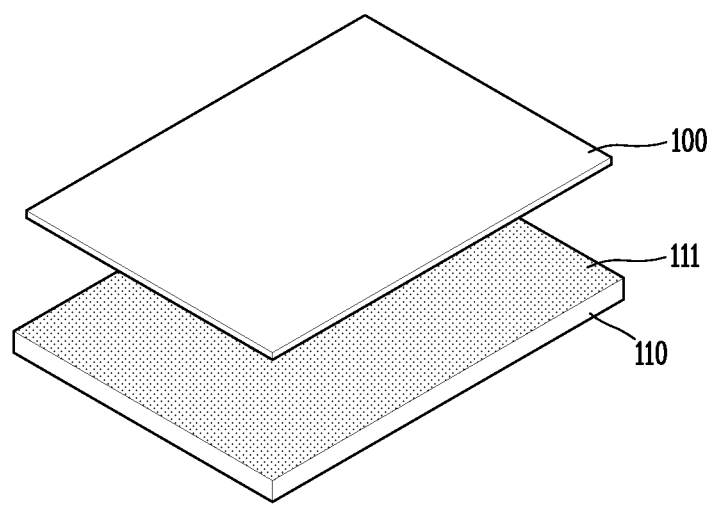

After a predetermined process is completed, as illustrated in FIG. 2D, the auxiliary substrate 110 is required to be separated from the thin glass substrate 100. Here, since the entire surface 111 of the auxiliary substrate 110 have been treated with plasma or surfactant, the auxiliary substrate 110 can be easily detached.

Namely, if bonding strength between the thin glass substrate 100 and the auxiliary substrate 110 is strong, it is difficult to physically separate the auxiliary substrate 110, so when the auxiliary substrate 110 is separated, the thin glass substrate 100 may be warped. However, in the case that the entire surface 111 of the auxiliary substrate 110 is plasma-treated, bonding strength between the thin glass substrate 100 and the auxiliary substrate 110 is lowered, facilitating separation of the auxiliary substrate 110. Alternatively, when the auxiliary substrate 110 is treated with a surfactant, OH groups between the auxiliary substrate 110 and the thin glass substrate 100 are reduced to mitigate bonding strength therebetween.

The auxiliary substrate 110 separated from the thin glass substrate 100 may be attached to a new glass substrate so as to be recycled for performing a new process.

Meanwhile, the method of treating the auxiliary substrate with plasma includes a partial surface processing method, in addition to the foregoing entire surface processing method. For example, in order to facilitate separation of the auxiliary substrate, a plasma treatment using fluorine, or the like, may be performed on a central partial surface of the auxiliary substrate. In this case, since only a partial surface of the auxiliary substrate is treated with fluorine, attachment is made in a region in which the both substrates can be in contact, and when the auxiliary substrate is separated, the auxiliary substrate can be easily separated due to the fluorine-treated region, namely, the partial surface.

Also, in the foregoing cases, the auxiliary substrate is treated with plasma or a surfactant to mitigate bonding strength between the auxiliary substrate and the thin glass substrate to facilitate separation of the auxiliary substrate, but the present invention is not limited thereto. In an embodiment of the present invention, a depression and protrusion pattern may be formed on the auxiliary substrate to mitigate bonding strength between the auxiliary substrate and the thin glass substrate. The method of forming a depression and protrusion pattern may include inorganic insulating layer patterning, organic insulating layer patterning, low temperature SiO2 etching, laser patterning method, and the like. When a depression and protrusion pattern is formed on the auxiliary substrate, surface roughness is increased to weaken bonding strength between the auxiliary substrate and the thin glass substrate.

However, the present invention is not limited to the foregoing auxiliary substrate attaching method. As mentioned above, in an embodiment of the present invention, the auxiliary substrate may be attached to the thin glass substrate in a vacuum state without using an adhesive or surface processing, and in this case, the two substrates may be attached through electrostatic force, vacuum force, van der Waals force, surface tension, and the like.

Meanwhile, a detachment method applicable to the foregoing cases may include a method of catching an upper portion of the auxiliary substrate or the thin glass substrate with a vacuum pad to lift the auxiliary substrate or the thin glass substrate. In this case, since the surface of the auxiliary substrate is treated with plasma or a surfactant or has a depression and protrusion pattern formed thereon, bonding strength between the two substrates is not so strong and the auxiliary substrate can be easily separated. However, the vacuum pad has a flat absorption surface to generate tension due to vertical detachment. Thus, in a spot at which detachment starts or ends, the auxiliary substrate may be damaged, which, thus, is required to be improved.

Thus, in an embodiment of the present invention, in order to facilitate detachment without damaging the auxiliary substrate, an arched drum pad having O-rings and a plurality of vacuum compartments is used. This will be described later.

After the auxiliary substrate is attached to the thin glass substrate, the thin glass substrate for an array substrate (hereinafter, it will be referred to as an 'array substrate' for the description purpose) with the forgoing auxiliary substrate attached thereto is undergone an array process. Namely, through the array process, a plurality of gate lines and a plurality of data lines are arranged to define pixel regions on the array substrate, and thin film transistors (TFT) as driving elements connected to the gate lines and the data lines are formed in the respective pixel regions (S102). Also, through the array process, pixel electrodes are formed to be connected to the TFTs and drive liquid crystal layers as a signal is applied thereto through the TFTs.

Also, color filter layers including red, green, and blue sub-color filters implementing colors and common electrodes are formed on the thin glass substrate with the foregoing auxiliary substrate attached thereto (hereinafter, referred to as a 'color filter substrate' for the description purpose) through a color filter process (S103). Here, in case of fabricating an in-plane switching (IPS) LCD device, the common electrode is formed on the array substrate with pixel electrodes formed thereon through the array process.

Subsequently, alignment films are printed on the color filter substrate and the array substrate, respectively, and rubbed to provide anchoring force or surface fixing force (i.e., a pretilt angle and an alignment direction) to liquid crystal molecules of the liquid crystal layer formed between the color filter substrate and the array substrate (S104, S105).

A sealing material is applied to the rubbed color filter substrate to form a predetermined seal pattern, and liquid crystal is dropped to the array substrate to form a liquid crystal layer (S106, S107).

Meanwhile, the color filter substrate and the array substrate are formed on a large mother substrate, respectively. In other words, a plurality of panel regions are formed on each of the large mother substrates, and TFTs as driving elements or color filter layers are formed in each of the plurality of panel regions.

In this case, the dropping method is a method in which liquid crystal is dropped and dispensed to an image display region of a first large mother substrate on which a plurality of array substrates are disposed or a second large mother substrate in which a plurality of color filter substrates are disposed by using a dispenser. The liquid crystal is uniformly distributed to the entirety of the image display region by pressure for attaching the first and second mother substrates, thus forming a liquid crystal layer.

Thus, in the case of forming the liquid crystal layer on the liquid crystal panel through a dropping method, a seal pattern is required to be formed as a closed pattern surrounding the outer edge of a pixel part region to prevent liquid crystal from being leaked to the outside of the image display region.

Through the dropping method, liquid crystal may be dropped within a short time, relative to a vacuum injection method, and even when the liquid crystal panel has a large size, the liquid crystal layer can be very rapidly formed. Also, since only a required amount of liquid crystal is dropped to the substrate, an increase in cost of the liquid crystal panel because high-priced liquid crystal is discarded, as in the vacuum injection method, is prevented, strengthening price competitiveness of a product.

Thereafter, in a state in which the first mother substrate and the second mother substrate with the liquid crystal dropped thereto and a sealing material coated thereon are aligned, pressure is applied thereto to attach the first and second mother substrates by the sealing material and allow the dropped liquid crystal to be uniformly spread on the entire liquid crystal panel (S108). Through this process, a plurality of liquid crystal panels including a liquid crystal layer formed thereon re formed on the first and second large mother substrates. After the first and second auxiliary substrates are separated from the first and second large mother substrates with the plurality of liquid crystal panels formed thereon, the first and second mother substrates are cut into a plurality of liquid crystal panels, and each liquid crystal panel is inspected (S109, S110).

Here, as mentioned above, in an embodiment of the present invention, the auxiliary substrate is separated from the liquid crystal panel by using an arched drum pad, and in this case, the formation of a push pin region by using a corner cut facilitates the separation of the auxiliary substrate. This will be described in detail with reference to the accompanying drawings.

Figure 3A:
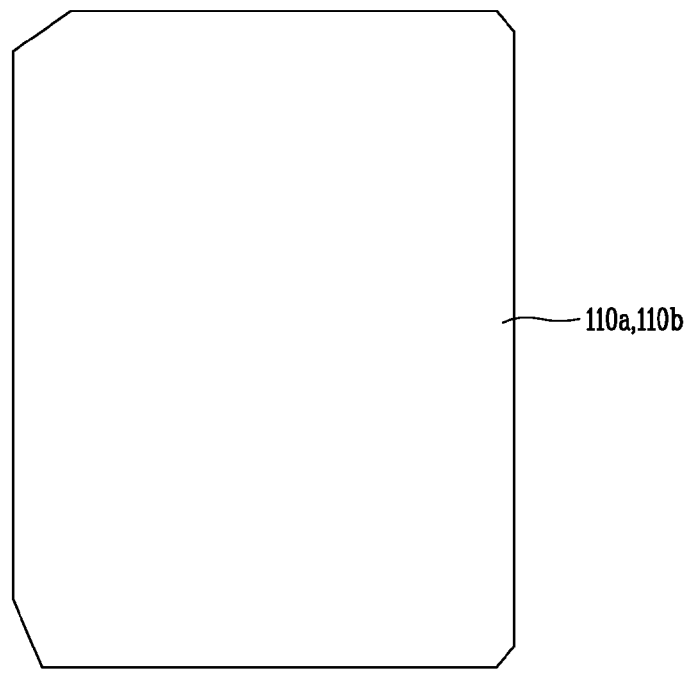
FIGS. 3A and 3B are plan views schematically illustrating first and second auxiliary substrates and first and second mother substrates with cut corners according to an embodiment of the present invention.
Figure 3B:
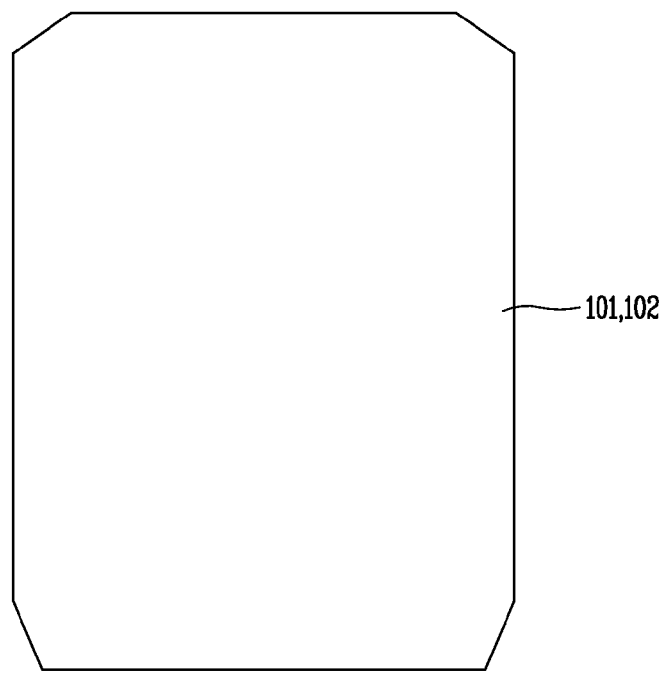

FIGS. 3A and 3B are plan vies schematically illustrating first and second auxiliary substrates and first and second mother substrates with cut corners.

Figure 4:
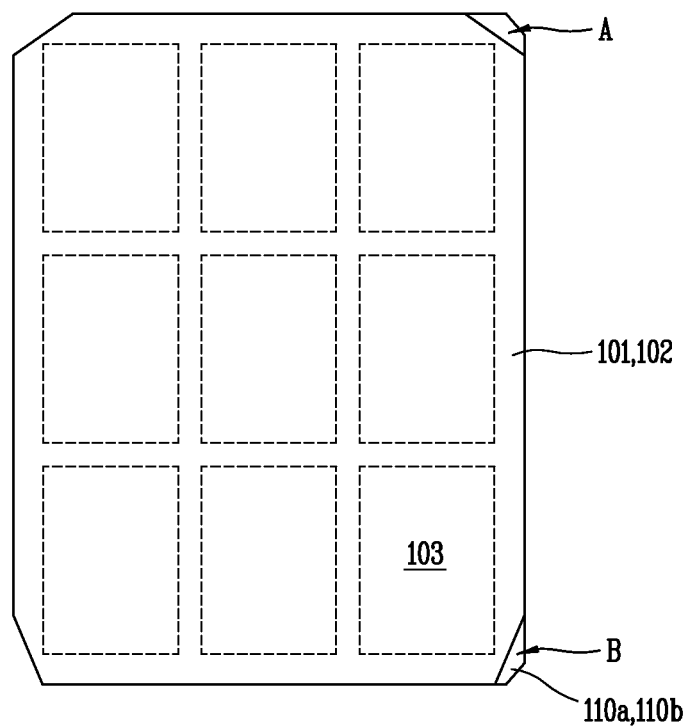
FIG. 4 is a plan view illustrating first and second mother substrates in which push pin regions are formed as the first and second auxiliary substrates with the cut corners are attached thereto according to an embodiment of the present invention.

FIG. 4 is a plan view illustrating first and second mother substrates in which push pin regions are formed as the first and second auxiliary substrates with the cut corners are attached thereto.

Referring to the drawings, as described above, in an embodiment of the present invention, before thin glass substrates, i.e., the first and second mother substrates 101 and 102, having a thickness ranging from 0.1 t to 0.4 t is put into a fabricating line, the first and second auxiliary substrate 110a and 110b having a thickness ranging from 0.3 t to 0.7 t are attached thereto to have warpage generation characteristics the same as or better than those of a glass substrate having a thickness of approximately 0.7 t used in a general LCD device, whereby sagging of the substrate, or the like, is prevented while it is carried or a unit process is performed thereon.

Here, the corners of the first and second mother substrates 101 and 102 and the first and second auxiliary substrates 110a and 110b in an attached state with the plurality of liquid crystal panels 103 assigned thereto are cut at a predetermined tilt angle, which is called a corner cut.

In particular, at least two corners of the first and second mother substrates 101 and 102 are cut further in an inward direction in order to distinguish directions and post-processing, so corner portions of the first and second auxiliary substrates 110a and 110b are exposed. The exposed regions may be used as push pin regions A and B to start a process of separating the first and second auxiliary substrates 110a and 110b.

Hereinafter, a method for separating an auxiliary substrate from a liquid crystal panel in an attached cell state after processes are completed will be described in detail with reference to the accompanying drawings.

Figure 5:
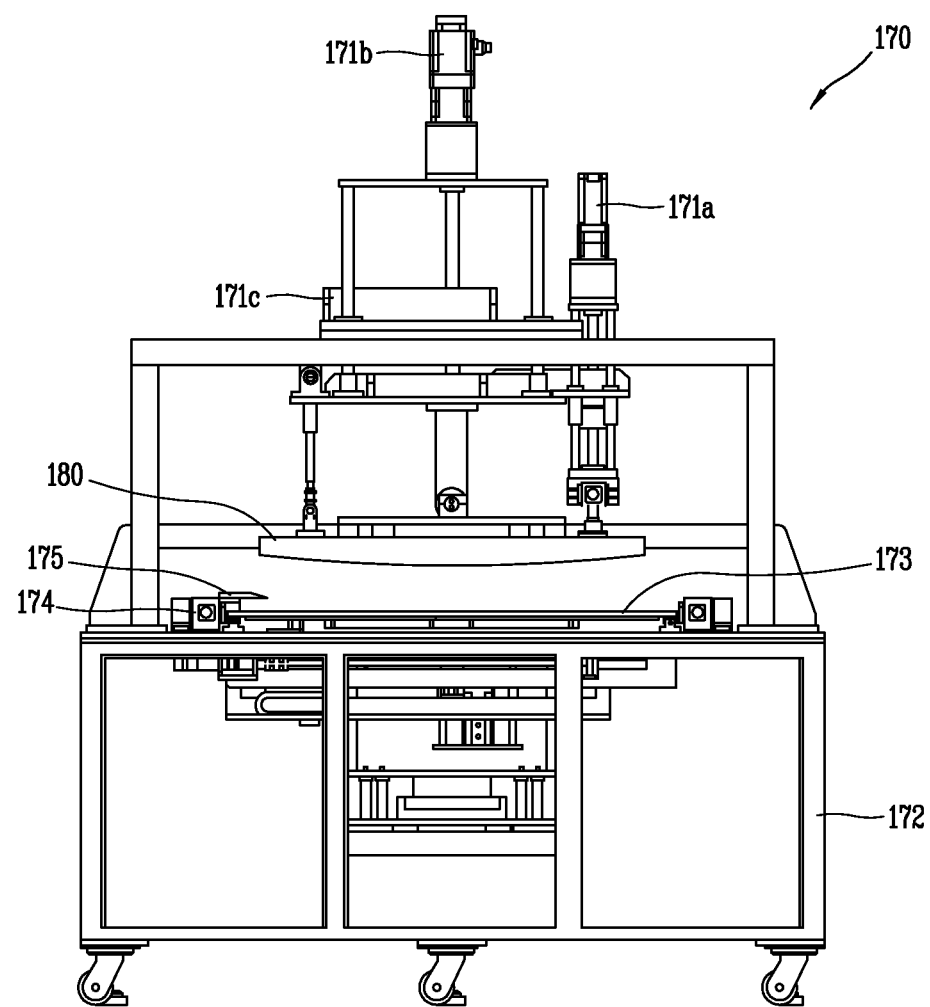
FIG. 5 is a view schematically illustrating a configuration of a detachment apparatus having an arched drum pad according to an embodiment of the present invention.

FIG. 5 is a view schematically illustrating a configuration of a detachment apparatus having an arched drum pad according to an embodiment of the present invention.

Figure 6:
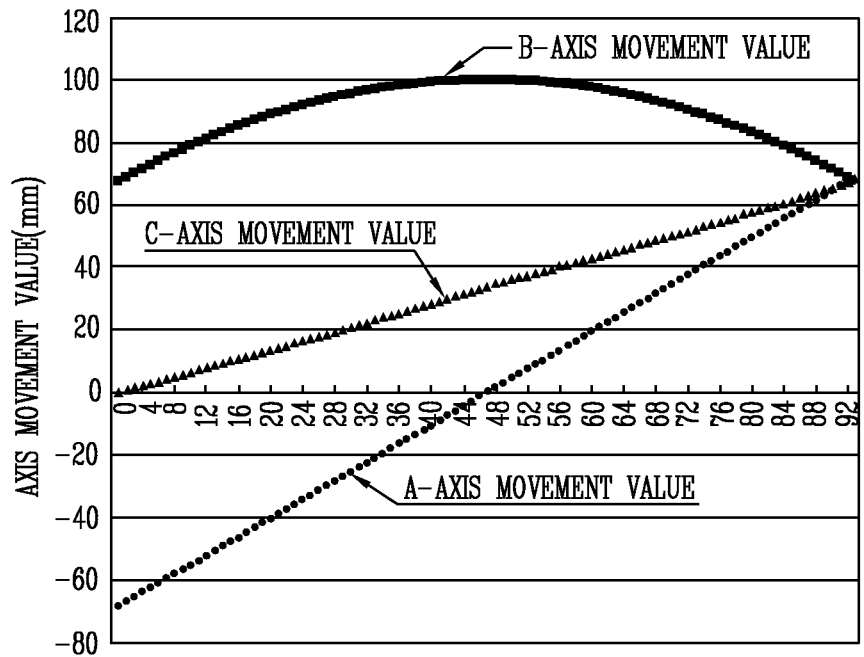
FIG. 6 is a graph showing shaft movement values over a control point of a driving unit in the detachment apparatus according to an embodiment of the present invention.

FIG. 6 is a graph showing shaft movement values over a control point of a driving unit in the detachment apparatus according to an embodiment of the present invention.

Figure 7:
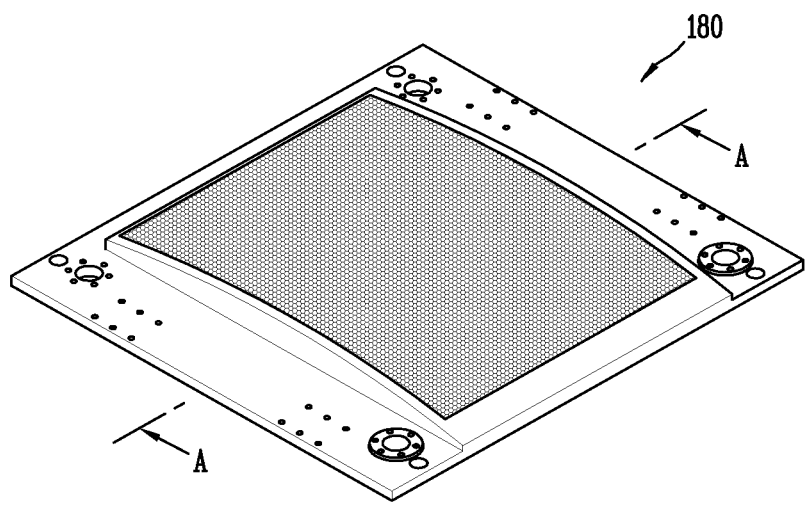
FIG. 7 is a perspective view schematically illustrating a configuration of an arched drum pad in the detachment apparatus according to an embodiment of the present invention.

FIG. 7 is a perspective view schematically illustrating a configuration of an arched drum pad in the detachment apparatus according to an embodiment of the present invention.

Figure 8:
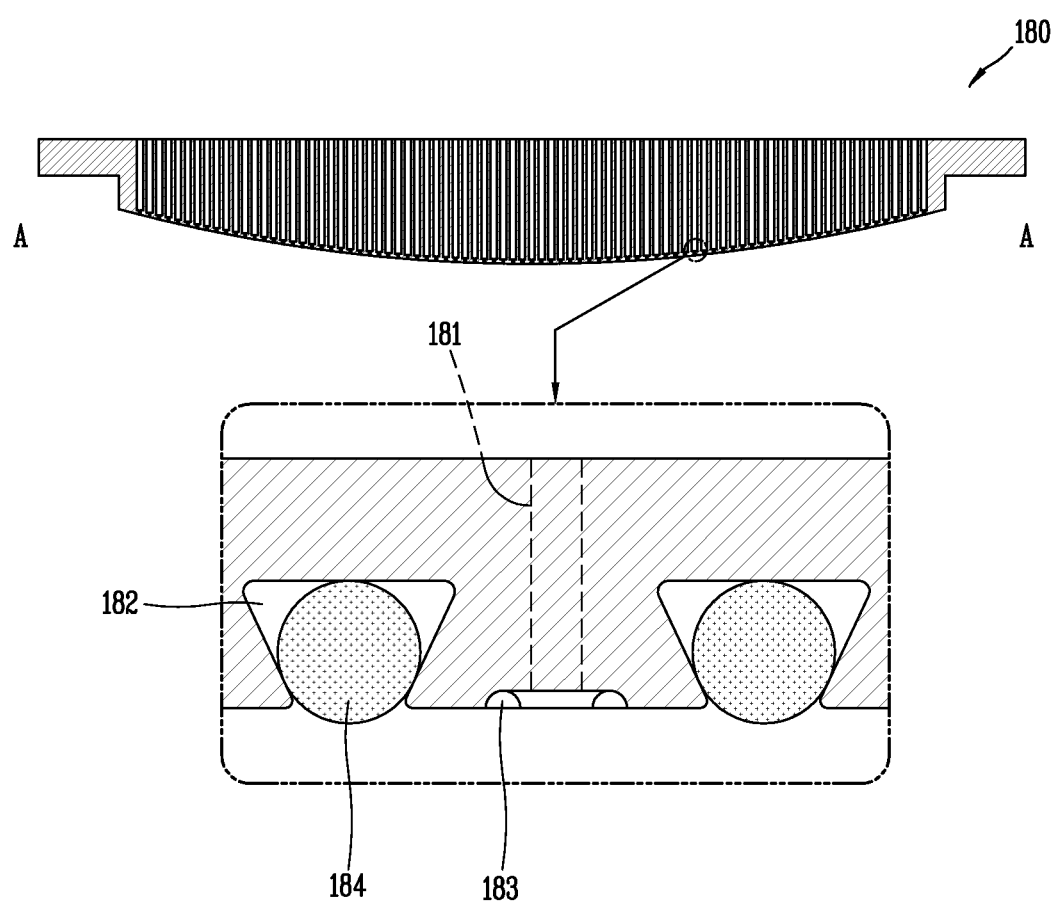
FIG. 8 is a view schematically illustrating a cross-section of the arched drum pad of FIG. 7 taken along line A-A.

FIG. 8 is a view schematically illustrating a cross-section of the arched drum pad of FIG. 7 taken along line A-A.

Figure 9A:
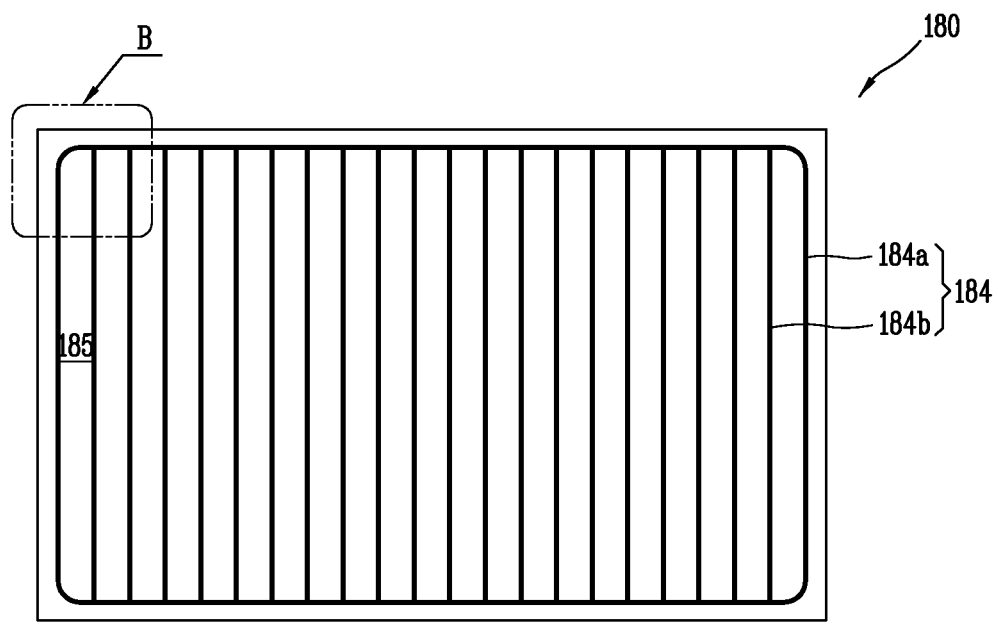
FIGS. 9A and 9B are views illustrating absorption surface of the arched drum pad illustrated in FIG. 7.
Figure 9B:
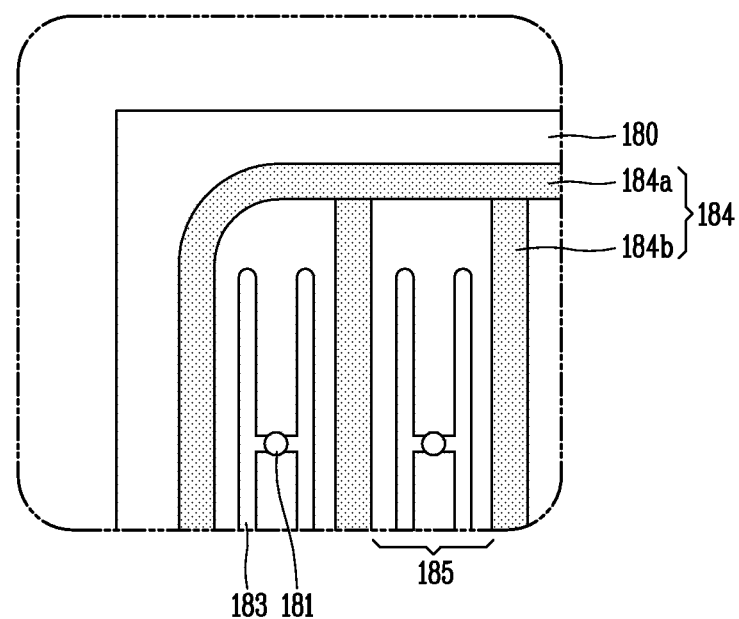

FIGS. 9A and 9B are views illustrating absorption surface of the arched drum pad illustrated in FIG. 7. Here, FIG. 9B is an enlarged view of a portion B of an absorption surface of the arched drum pad illustrated in FIG. 9A.

Referring to FIG. 5, a detachment apparatus 170 according to an embodiment of the present invention includes a table 173 provided in a frame 172 and allowing an object to be processed to be installed thereon, a drum pad 180 installed above the table 173, and a plurality of driving units 171a, 171b, and 171c controlling a position of the drum pad 180.

In this case, for example, the object to be processed may be a liquid crystal panel in a cell state after a process is completed, and here, auxiliary substrates are attached to both sides of the liquid crystal panel for performing a process on a thin glass substrate.

In order to separate the auxiliary substrates from the process-completed liquid crystal panel, the detachment apparatus 170 may further include auxiliary detachment equipment 174 including a push pin and a gap knife. The auxiliary detachment equipment 174 may be installed in one side or in both sides of the table 173.

Also, the detachment apparatus 170 according to an embodiment of the present invention may further include an air knife 175 jetting air to a gap between the liquid crystal panel and the auxiliary substrate in a detachment process such that the auxiliary substrate can be easily separated.

The plurality of driving units 171a, 171b, and 171c may include an A-axis driving unit 171a, a B-axis driving unit 171b, and a C-axis driving unit 171c adjusting a vertical rotation, a vertical height, and a horizontal position of the drum pad 180, respectively. For example, the plurality of driving units 171a, 171b, and 171c may be configured as servo motors.

The A-axis driving unit 171a may be connected to one side of the drum pad 180, and a vertical rotation of the drum pad 180 may be made according to a vertical movement of the A-axis driving unit 171a.

The B-axis driving unit 171b may be connected to a central portion of the drum pad 180 to adjust a vertical height of the entirety of the drum pad 180. The C-axis driving unit 171c may be installed between the B-axis driving unit 171b and the drum pad 180 to adjust a horizontal position of the entirety of the drum pad 180.

While detachment is being performed, axes of the A-axis driving unit 171a and the B-axis driving unit 171b are moved in a vertical direction, and an axis of the C-axis driving unit 171c is moved in a horizontal direction.

For example, referring to FIG. 6, in order to detach the auxiliary substrate by using the drum pad 180, movement values of the axes of the respective driving units 171a, 171b, and 171c may be set in respective points from a point (point 0) at which detachment starts to a point (point 92) at which detachment is terminated, and axes of the respective driving units 171a, 171b, and 171c are moved vertically or horizontally.

In this case, the case in which the movement values of the axes of the respective driving units 171a, 171b, and 171c are set according to a total of 93 control points is taken as an example, but it is merely illustrative and the present invention is not limited thereto.

In this manner, since the plurality of driving units 171a, 171b, and 171c including three axes are used and coordinate axes of the respective driving units 171a, 171b, and 171c are calculated and set, the auxiliary substrate can be detached while the table 173 and the drum pad 180 are positioned at a predetermined interval therebetween.

The auxiliary substrate detached from the liquid crystal panel and attached to the drum pad 180 may undergo a separation process performed in reverse order of the detachment process, whereby the auxiliary substrate can be separated from the drum pad 180.

Here, the table 173 according to an embodiment of the present invention may have a temperature ranging from 100° C. to 150° C. For example, when glass and glass are separated, if the table 173 is maintained at a temperature of approximately 100° C., bonding strength may be reduced to half (½). Thus, since bonding strength is reduced, when the auxiliary substrate is detached from the liquid crystal panel, less stress is applied to the auxiliary substrate, preventing glass damage, a cell rigidity degradation.

According to results of checking a change in detachment force according to a temperature of the table 173, it can be seen that, when the auxiliary substrate is detached at a temperature of 110° C., the detachment force is reduced by about 0.5 kgf, in comparison to the case the auxiliary substrate is detached at room temperature (about 1.16 kgf).

Referring to FIGS. 7, 8, 9A, and 9B, the drum pad 180 according to an embodiment of the present invention has an arc shape with a predetermined curvature, and include O-rings 184 formed on a lower surface, i.e., an absorption surface, thereof and a plurality of vacuum compartments 185 formed on the lower surface and demarcated by the O-rings 184.

The O-rings 184 may include a first O-ring 184a having a rectangular shape constituting the rim and a plurality of second O-rings 184b connected to both sides of the first O-ring 184 and having a lattice shape.

Here, in order to minimize damage to the auxiliary substrate when detached, the O-rings 184 may be made of a material having a low degree of hardness (within 30), and a surface of the O-ring 184 may be coated to allow the auxiliary substrate to be easily detached from the arched drum pad 180.

Namely, in order to provide excellent absorptive power and prevent damage to the auxiliary substrate, the O-ring 184 may be made of a soft material having excellent thermal, chemical, and physical durability such as natural rubber, silicon, or the like. If the O-ring 184 is made of a material having adhesion, a material reducing adhesion may be coated on the surface of the O-ring 184 to use the O-ring 184 in order to eliminate a possibility of damage to the auxiliary substrate.

The vacuum compartments 185 are demarcated by the first and second O-rings 184a and 184b and have an elongated rectangular shape. Each vacuum compartment 185 includes a vacuum groove line 183 having a trapezoid shape and a plurality of absorption holes 181 formed in the vacuum groove line 183 and extending to an upper surface of the drum pad 180, forming individual vacuum in each of the vacuum compartments 185.

As mentioned above, when the auxiliary substrate is detached by using the absorption pad with a flat lower surface, force applied to the entire surface thereof may strongly act on a point at which detachment starts or ends temporarily, and in this case, the auxiliary substrate may be damaged or the equipment may be overloaded.

Thus, in an embodiment of the present invention, the lower surface of the drum pad 180 is formed to have an arched shape, recesses 182 are formed on the lower curved surface of the drum pad 180 and the first and second O-rings 184a and 184b are inserted therein to form the plurality of vacuum compartments 185 to allow the vacuum compartments 185 individually absorb the auxiliary substrate.

Also, as mentioned above, the absorption hole 181 is formed to penetrate through the drum pad 180, and vacuum may be formed through the absorption hole 181.

As for the formation of vacuum by each vacuum compartment 185, vacuuming is performed by the vacuum compartments sequentially or wholly by using a vacuum ejector or a vacuum pump, and as the drum pad 180 passes above the auxiliary substrate, it sequentially absorbs the auxiliary substrate.

A surface of the arched drum pad 180 may be coated with fluorine or carbon nano-tube in order to prevent damage to the auxiliary substrate due to static electricity.

In the drum pad 180 according to an embodiment of the present invention, the vacuum compartments 185 may be designed such that a non-absorption region is minimized and a size of each vacuum compartment is minimized.

Also, a protrusion height of the O-ring 184 is minimized to prevent damage to the auxiliary substrate due to a step of the O-ring 184.

Hereinafter, a method for separating the auxiliary substrate from the liquid crystal panel in an attached cell state after the processes are completed will be described in detail with reference to the accompanying drawings.

Figure 10:
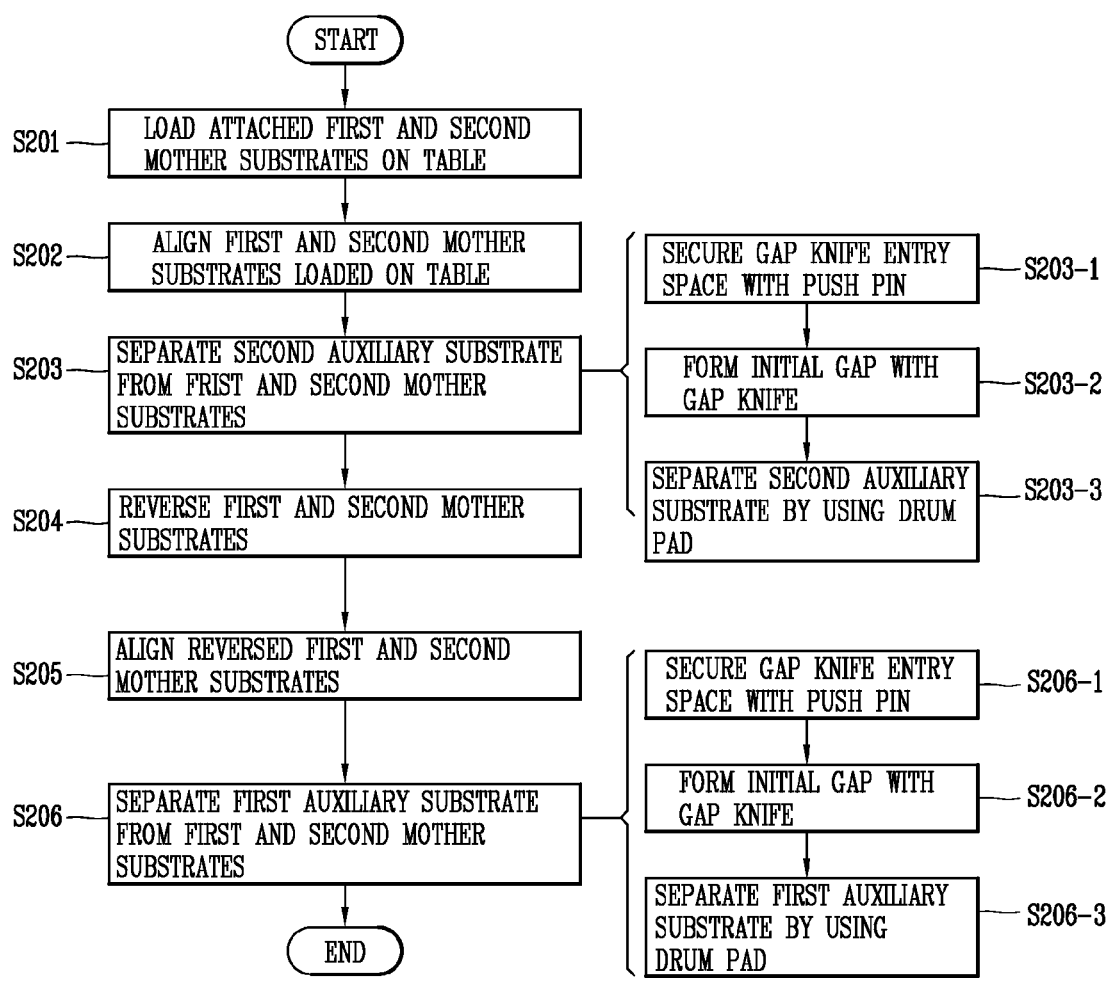
FIG. 10 is a flow chart illustrating a process of separating an auxiliary substrate in the method for fabricating a lightweight, thin LCD device according to an embodiment of the present invention.

FIG. 10 is a flow chart illustrating a process of separating an auxiliary substrate in the method for fabricating a lightweight, thin LCD device according to an embodiment of the present invention.

FIGS. 11A through 11L are cross-sectional views sequentially illustrating the process of separating an auxiliary substrate in the method for fabricating a lightweight, thin LCD device according to an embodiment of the present invention. However, the present invention is not limited to the order of the separation processes of the auxiliary substrate illustrated in FIGS. 11A through 11I.

Figure 11A:
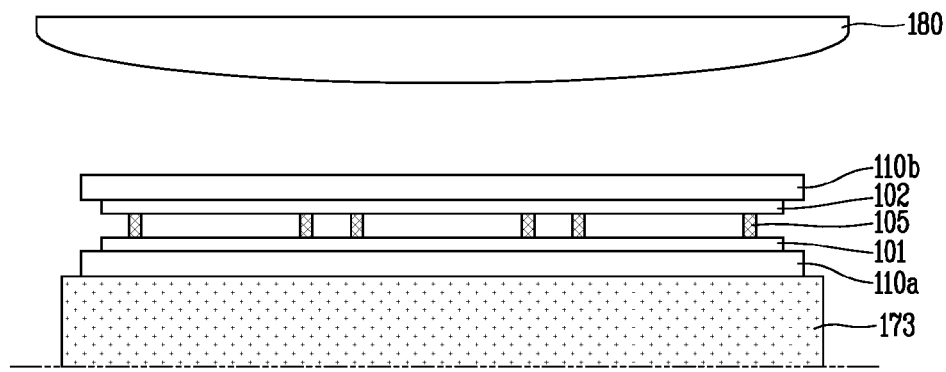
FIGS. 11A through 11L are cross-sectional views sequentially illustrating the process of separating an auxiliary substrate in the method for fabricating a lightweight, thin LCD device according to an embodiment of the present invention.

As illustrated in FIG. 11A, in order to separate the first and second auxiliary substrates 110a and 110b, which were attached to the first and second mother substrates 101 and 102 after the processes were completed, from the first and second mother substrates 101 and 102, first, the first and second mother substrates 101 and 102 are loaded onto the table 173 of the detachment apparatus according to an embodiment of the present invention (S201).

Here, the first mother substrate 101 with the TFT array substrates formed thereon and the second mother substrate 102 with the color filter substrates formed thereon are formed of thin glass substrate having a thickness ranging from 0.1 t to 0.4 t, and in this case, in order to perform processes, the first and second mother substrates 101 and 102 may be treated with plasma or a surfactant or first and second auxiliary substrates 110a and 110b having a depression and protrusion pattern formed thereon and having a thickness ranging from 0.3 t to 0.7 t may be attached thereto. However, the first and second thin mother substrates 101 and 102 and the first and second auxiliary substrates 110a and 110b are not limited to the foregoing thicknesses.

The first and second thin mother substrates 101 and 102 and the first and second auxiliary substrates 110a and 110b may be brought into contact to be attached in a vacuum state, in this case, bonding strength between the two substrates 101 and 110a and 102 and 110b may be based on vacuum force, van der Waals force, electrostatic force, molecular binding, and the like.

In this case, for example, the first and second mother substrates 101 and 102 are loaded onto the table 173 such that the second auxiliary substrate 110b to be separated faces upward, and the arched drum pad 180 according to an embodiment of the present invention is installed above the loaded first and second mother substrates 101 and 102.

The first and second mother substrates 101 and 102 loaded on the table 173 are aligned with the drum pad 180 thereabove through a predetermined aligning unit (S202).

Figure 11B:
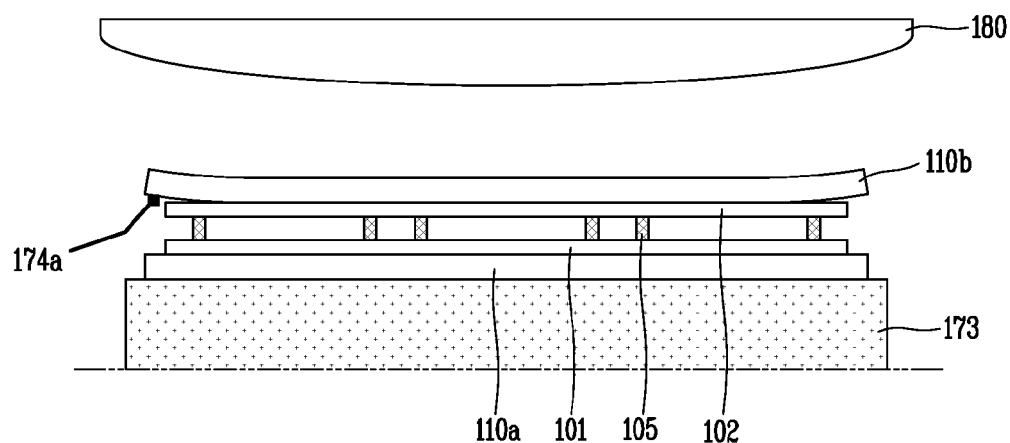

Thereafter, as illustrated in FIG. 11B, push pin regions exposed from both corners of the second auxiliary substrate 110b are pushed upwardly with predetermined pressure by using a bar-type push pin 174a to form a gap knife entry space between the second auxiliary substrate 110b and the thin glass substrate, i.e., the second mother substrate 102 (S203-1).

Figure 11C:
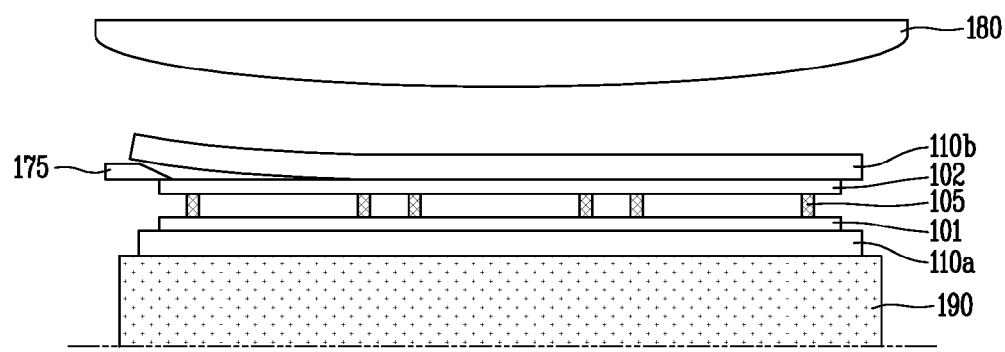

As illustrated in FIG. 11C, a predetermined gap knife 175 is inserted into a corner space between the second auxiliary substrate 110b and the second mother substrate 102, i.e., the gap knife entry space, and transferred from one direction of the table 173 to the other direction thereof to detach edge portions between the second auxiliary substrate 110b and the second mother substrate 102 to form an initial gap (S203-2). However, the present invention is not limited to the foregoing initial gap formation method.

Figure 11D:
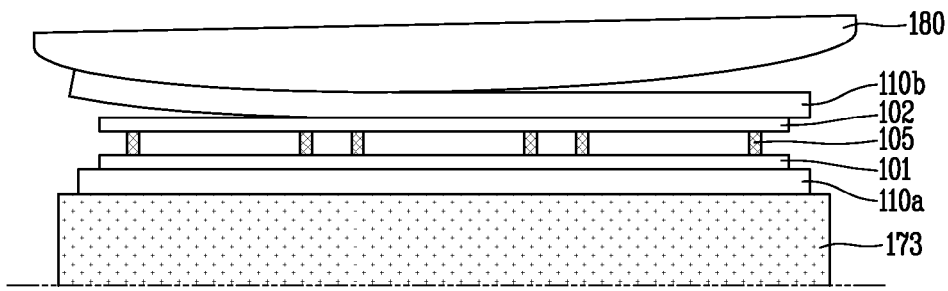

Thereafter, as illustrated in FIG. 11D, by lowering a front end of the drum pad 180 and simultaneously lifting a rear end thereof, a front surface of the second auxiliary substrate 110b is absorbed through the vacuum compartments in the front end of the drum pad 180. However, the present invention is not limited thereto.

Figure 11E:
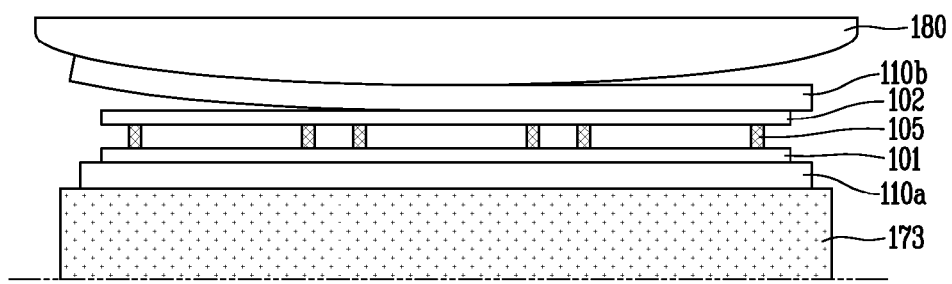
Figure 11F:
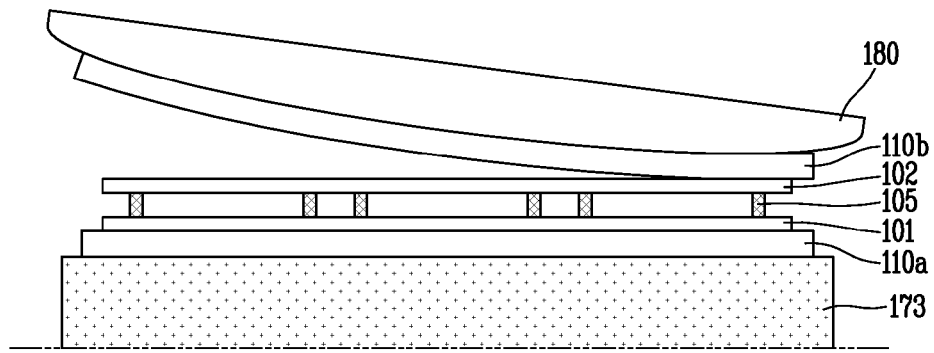
Figure 11G:
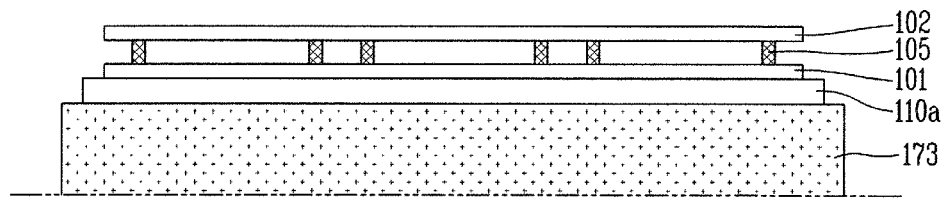

As illustrated in FIGS. 11E, 11F, and 11G, in a state in which the second auxiliary substrate is absorbed, the front end of the drum pad 180 is gradually lifted and the rear end thereof is gradually lowered simultaneously, thus completing detachment of the second auxiliary substrate 110b (S203-3, S203). At this time, the second auxiliary substrate 110b is absorbed from the front end toward the rear end thereof by the vacuum compartments of the drum pad 180, whereby the second auxiliary substrate 110b is separated.

Here, as described above, the axes of the respective driving units are vertically or horizontally moved according to values previously set for each point of the second auxiliary substrate 110b from a point at which detachment starts to a point at which detachment ends.

Thus, since the coordinate axes of the respective driving units are moved according to the pre-set values by using the plurality of driving units including three axes, the auxiliary substrate can be detached while the table 173 and the drum pad 180 are positioned at a predetermined interval therebetween.

In this manner, a separating process of the second auxiliary substrate 110*b*, which was attached to the drum pad 180 after having been detached from the first and second mother substrates 101 and 102, is performed in reverse order of the detaching process, so the second auxiliary substrate 110*b* can be separated from the drum pad 180 and recycled.

Figure 11H:
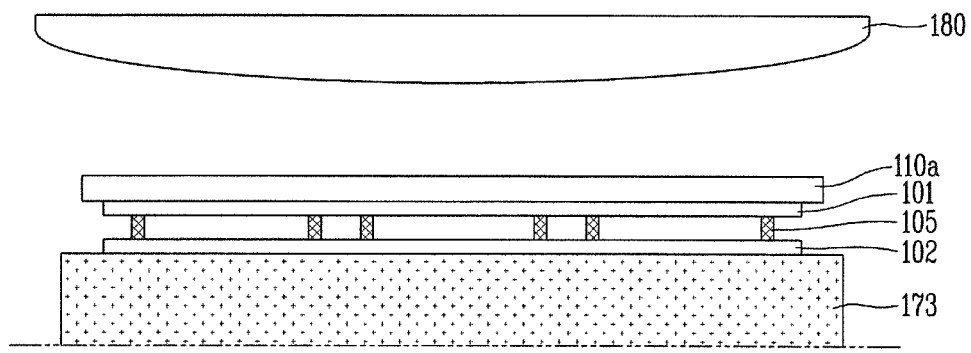

Thereafter, as illustrated in FIG. 11H, the first and second mother substrates 101 and 102 without the second auxiliary substrate are reversed and loaded onto the table 173 of the detachment apparatus (S204).

Namely, the first and second mother substrates 101 and 102 are loaded such that the first auxiliary substrate 110*a* to be separated faces upward, and the foregoing arched drum pad 180 is installed above the first and second mother substrates 101 and 102.

The first and second mother substrates 101 and 102 loaded on the table 173 of the detachment apparatus are aligned with the drum pad 180 thereabove through an aligning unit as mentioned above (S205).

Figure 11I:
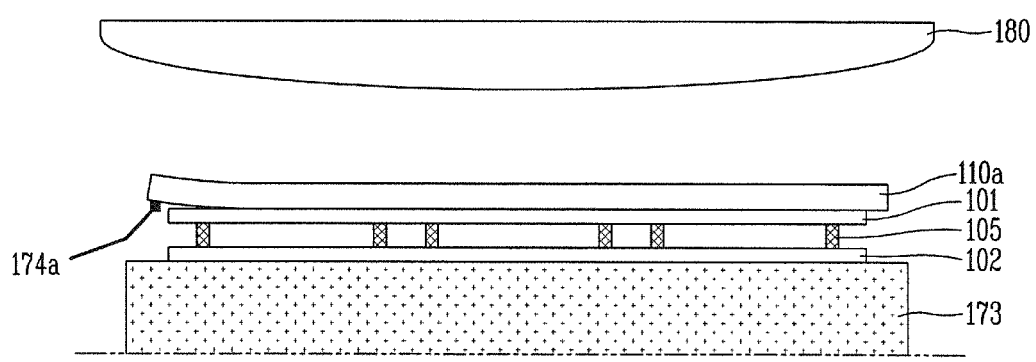

Thereafter, as illustrated in FIG. 11I, the push pin regions exposed from both corners of the first auxiliary substrate 110*a* are pressed upward with predetermined pressure by using the push pin 174*a* to form a gap knife entry space between the first auxiliary substrate 110*a* and the thin glass substrate, i.e., the first mother substrate 101 (S206-1).

Figure 11J:
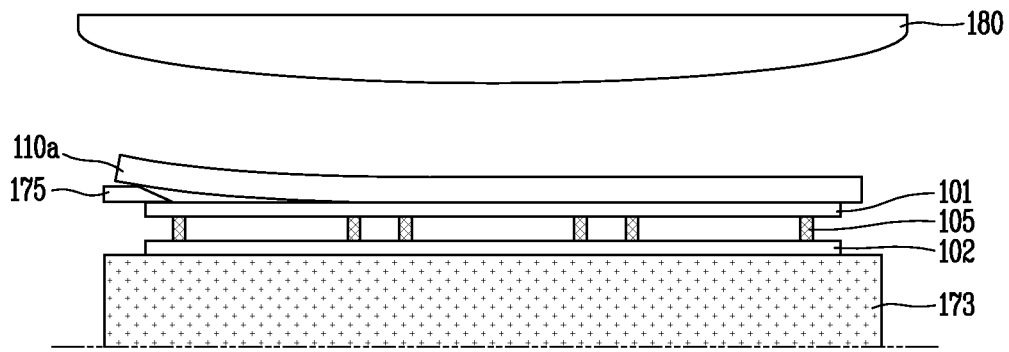

As illustrated in FIG. 11J, the predetermined gap knife 175 is inserted into a corner space between the second auxiliary substrate 110*a* and the first mother substrate 101, i.e., the gap knife entry space, and transferred from one direction of the table 173 to the other direction thereof to detach edge portions between the first auxiliary substrate 110*a* and the first mother substrate 101 to form an initial gap (S206-2). However, the present invention is not limited to the foregoing initial gap formation method.]

Figure 11K:
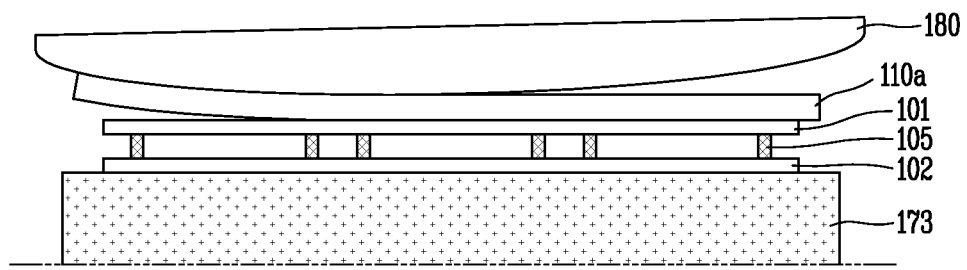

Thereafter, as illustrated in FIG. 11K, by lowering the front end of the drum pad 180 and simultaneously lifting the rear end thereof, a front surface of the first auxiliary substrate 110*a* is absorbed through the vacuum compartments in the front end of the drum pad 180. However, the present invention is not limited thereto.

Figure 11L:
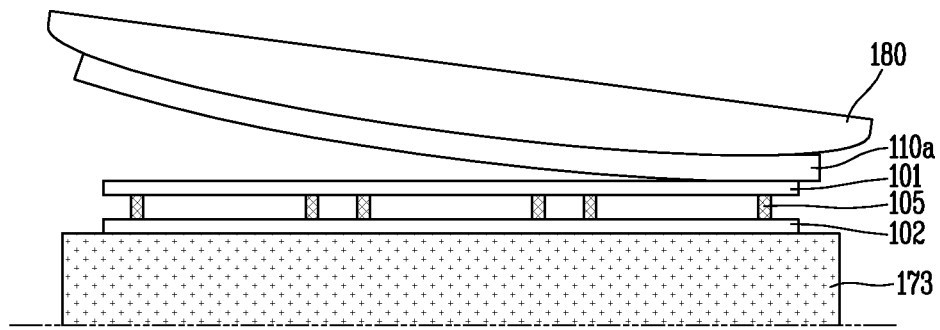

As illustrated in FIG. 11L, in a state in which the second auxiliary substrate is absorbed, the front end of the drum pad 180 is gradually lifted and the rear end thereof is gradually lowered simultaneously, thus completing detachment of the first auxiliary substrate 110*a* (S206-3, S206). In this case, the first auxiliary substrate 110*a* is absorbed from the front end toward the rear end thereof by the vacuum compartments of the drum pad 180, whereby the first auxiliary substrate 110*a* is separated.

Here, as described above, the axes of the respective driving units are vertically or horizontally moved according to values previously set for each point of the first auxiliary substrate 110*a* from a point at which detachment starts to a point at which detachment ends.

Thus, since the coordinate axes of the respective driving units are moved according to the pre-set values by using the plurality of driving units including three axes, a predetermined space is maintained between the table 173 and the drum pad 180 and the first auxiliary substrate 110*a* may be detached.

In this manner, a separating process of the first auxiliary substrate 110*a*, which was attached to the drum pad 180 after having been detached from the first and second mother substrates 101 and 102, is performed in reverse order of the detaching process, so the first auxiliary substrate 110*a* can be separated from the drum pad 180 and recycled.

As described above, the method for fabricating a lightweight, thin LCD device according to an embodiment of the present invention, the auxiliary substrate can be easily separated from the liquid crystal panel in an attached cell state after processes are completed, by using the arched drum pad having O-rings and a plurality of vacuum compartments. As a result, a tack time can be minimized and the processes are stabilized, enhancing price competitiveness of the product.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A detachment apparatus for separating an auxiliary substrate from an object to be processed, the detachment apparatus comprising:
   a table configured to load the object to be processed; and
   an arched drum pad installed over the table and including O-rings on a lower surface thereof, wherein the O-rings include a first O-ring constituting a rim and a plurality of second O-rings connected to both sides of the first O-ring, and a plurality of vacuum compartments demarcated by the first and second O-rings.

2. The detachment apparatus of claim 1, wherein the object to be processed is a process-completed liquid crystal panel in a cell state, and auxiliary substrates are attached to both sides of the liquid crystal panel.

3. The detachment apparatus of claim 2, further comprising:
   a push pin and a gap knife for forming an initial gap to separate each of the auxiliary substrates from the liquid crystal panel.

4. The detachment apparatus of claim 2, further comprising:
   an air knife jetting air to a gap between the liquid crystal panel and each of the auxiliary substrates during a detachment process to facilitate separation of each of the auxiliary substrates.

5. The detachment apparatus of claim 1, further comprising a plurality of driving units configured to control a position of the drum pad,
   wherein the plurality of driving units include an A-axis driving unit, a B-axis driving unit, and a C-axis driving unit adjusting a vertical rotation, a vertical height, and a horizontal position of the arched drum pad, respectively.

6. The detachment apparatus of claim 5, wherein the A-axis driving unit is connected to one side of the arched drum pad, and the vertical rotation of the arched drum pad is made according to a vertical movement of the A-axis driving unit.

7. The detachment apparatus of claim 5, wherein the B-axis driving unit is connected to a central portion of the arched drum pad to adjust the vertical height of the entirety of the arched drum pad, and the C-axis driving unit is installed between the B-axis driving unit and the drum pad to adjust the horizontal position of the entirety of the arched drum pad.

8. The detachment apparatus of claim 5, wherein movement values of the axes of the respective driving units are set for respective points from a starting point at which detachment of auxiliary substrates from a liquid crystal panel starts to an end point at which the detachment ends, and the axes of the respective driving units are moved vertically or horizontally according to the set values.

9. The detachment apparatus of claim 1, wherein the first O-ring has a rectangular shape constituting the rim and the plurality of second O-rings has a lattice shape.

10. The detachment apparatus of claim 1, wherein the O-rings are made of natural rubber or silicon.

11. The detachment apparatus of claim 1, wherein the vacuum compartments have an elongated rectangular shape, and include a vacuum groove line having a trapezoid shape and a plurality of absorption holes in the vacuum groove line and extending to an upper surface of the arched drum pad for providing individual vacuum in each of the vacuum compartments.

12. The detachment apparatus of claim 1, wherein a surface of the arched drum pad is coated with fluorine or carbon nano-tubes to prevent damage to auxiliary substrates attached to both sides of a process-completed liquid crystal panel in a cell state due to static electricity.

* * * * *